United States Patent [19]

Schroeder

[11] Patent Number: 4,947,906
[45] Date of Patent: Aug. 14, 1990

[54] DEBARKER

[75] Inventor: Hartwig F. T. Schroeder, Natal, South Africa

[73] Assignee: H L & H Timber Products, Johannesburg, South Africa

[21] Appl. No.: 299,635

[22] Filed: Jan. 23, 1989

[51] Int. Cl.$^5$ .............................................. B27L 1/00
[52] U.S. Cl. ................................ 144/208 J; 144/2 Z; 144/208 R; 144/341; 241/193
[58] Field of Search ................ 144/2 Z, 208 R, 208 J, 144/341; 241/193, 194

[56] References Cited

U.S. PATENT DOCUMENTS

| | | | |
|---|---|---|---|
| 2,625,968 | 1/1953 | Eklund et al. | 144/208 J |
| 4,214,616 | 7/1980 | Brisson | 144/208 J |
| 4,640,325 | 2/1987 | Vaders | 144/208 J |
| 4,711,280 | 12/1987 | Schmidt | 144/208 J |
| 4,721,139 | 1/1988 | Peterson | 144/208 J |
| 4,787,431 | 11/1988 | Demlow | 144/208 J |

*Primary Examiner*—W. Donald Bray
*Attorney, Agent, or Firm*—Young & Thompson

[57] ABSTRACT

This invention relates to a method of and apparatus for delimbing and debarking tree trunks and branches. The apparatus includes two elongated rotors which are parallel to, spaced from each other and mounted for rotation in the housing, flexible flail elements on the rotors, means for driving the rotors in contra rotation and a roller guide arrangement on the housing for guiding elongated tree trunks and branches between the rotors to be delimbed and debarked by the flail elements on the rotors.

7 Claims, 2 Drawing Sheets

DEBARKER

FIELD OF THE INVENTION

This invention relates to a method of and apparatus for delimbing and bebarking elongated tree trunks and branches.

BACKGROUND TO THE INVENTION

Debarkers which include a ring rotor which carries internal cutting blades which are inwardly biased and through which one log at a time is axially fed to be debarked by the rotating blades is known. Problems with debarkers of this type is, however, that the bark cutting blades are expensive and need to by professionally sharpened and further that the cutting pressure of the blades on the bark generally increases proportionally with the diameter of the logs being debarked so that the timber of large diameter logs is damaged and the bark on small logs is not properly removed. Logs having a diameter less than 50 mm normally cannot be debarked with these machines. Additionally, wet bark is more easily cut than dry bark resulting in wet (freshly cut) timber being damaged by the cutting blades and bark which is dry not being adequately removed. Another time consuming problem associated with debarkers of the above type is that they are incapable of delimbing logs. The logs therefore need to be manually delimbed before being fed into the rotor of the machine.

OBJECT OF THE INVENTION

It is the object of this invention to provide a method of and apparatus for simultaneously delimbing and debarking a plurality of tree trunks and branches to minimise the problems mentioned above with known debarkers.

SUMMARY OF THE INVENTION

Debarking apparatus according to the invention includes a housing, two elongated rotors which are parallel to, spaced from each other and mounted for rotation in the housing, flexible flail elements on the rotors, means for driving the rotors and a guide arrangement on the housing for guiding elongated timber members between the rotors to be delimbed and debarked by the flails on the rotors.

Further according to the invention the flail members on the rotors are spaced from each other in the axial directions of the rotors with the lengths of the flail elements being such that the circumferences of their paths of rotation overlap each other in the space between the rotors. Conveniently the flail elements are lengths of metal chain.

Still further according to the invention the rotor drive means is adapted to drive the rotors in opposite directions of rotation with the direction of rotation of each rotor, on a line which is normal to and intersects both rotor axes, being in the same direction and in the direction in which a timber member is guided from the guide arrangement between the rotors.

The timber element guide arrangement conveniently includes two hoirizontal and parallel guide rollers with at least one of the rollers being attached to the housing for movement towards and away from the other, means biasing the movable roller towards the other and means for driving at least one of the rollers to feed a timber element placed between the rollers into the housing. The housing may additionally carry a second pair of horizital and parallel output rollers on the opposite side of the flail rotors to that on which the guide rollers are situated with at least one of the output rollers being attached to the housing for movement towards and away from the other.

Preferably each roller of each pair of rollers is movably attached to the housing for movement towards and away from the other roller in its pair with each roller in each pair being biased towards the other.

Yet further according to the invention the debarking apparatus includes means for driving each of the guide and output rollers to drive a timber element in a uniform direction through the housing. Preferably each of the guide and output rollers is fixed to a drive shaft and the rotor driving means is a hydraulic motor on at least one of the drive shafts of each pair with the motors being interconnected for series operation so that the driven rollers rotate at a common speed.

There is also provided according to the invention a method of operating the above debarking apparatus in which the rotors are rotated in contra-rotation with the peripheral velocity of each of the flail chains on the rotors being between 20 and 40 meters/second. If flexible elements other than chains are used as flails it will be necessary empirically to determine the optimum rotor speed for debarking logs of various degrees of wetness.

BRIEF DESCRIPTION OF THE DRAWINGS

An embodiment of the invention will now be described by way of example only with reference to the drawings in which.

DETAILED DESCRIPTION OF THE PREFERRED EMBODIMENT

Figure 1:
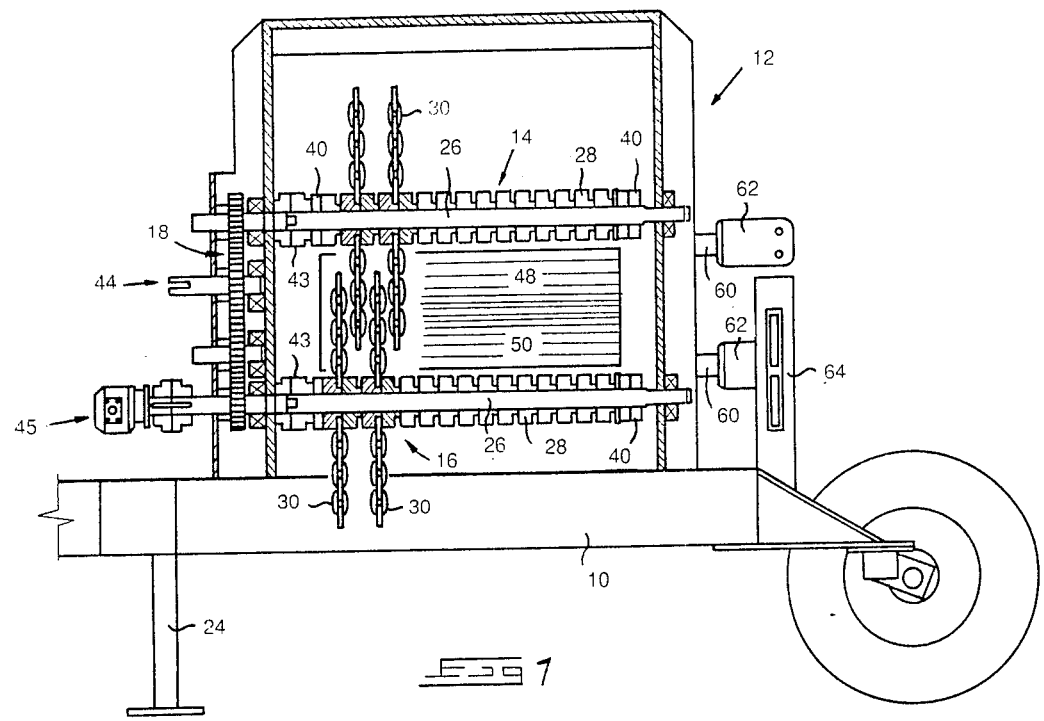
FIG. 1 is a sectioned side elevation of the debarking apparatus of the invention.

The debarking apparatus of the invention is shown in the drawings to consist of a wheeled chassis 10, a housing 12, flail rotors 14 and 16, a rotor drive arrangement 18, a log guiding arrangement 20 and an output roller arrangement 22.

The chassis 10 of the debarking arrangement is shown fragmented in FIG. 1 but includes on its left hand side, not shown, a tow hitch arrangement for connecting the chassis to a tow bar on a vehicle and a telescopic leg 24 which is adjustable in length for supporting the chassis free of the towing vehicle.

Figure 3:
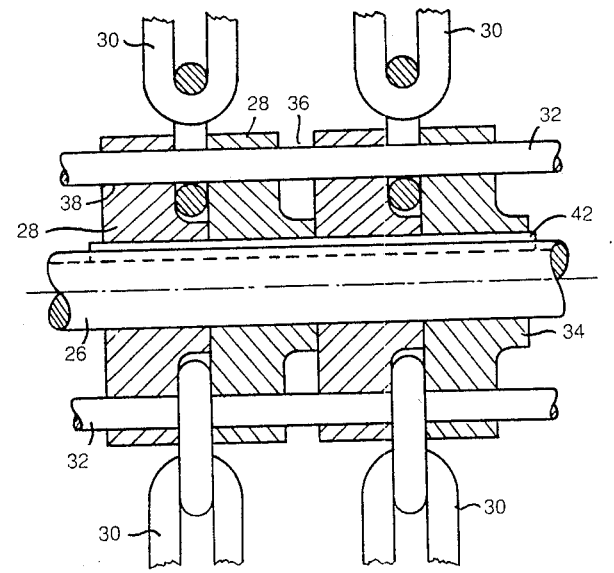
FIG. 3 is a fragmentary section view of one of the flail rotors of the FIG. 1 apparatus.

The flail rotors 14 and 16 are each journalled for rotation in the end walls of the housing and are more clearly shown in FIG. 3 to consist of drive shafts 26 which are journalled for rotation in bearings which are mounted on the housing end walls, hub elements 28 which are shaped as shown in FIG. 3, flail chains 30 and locking rods 32.

The hub elements 28 each include a boss section 34 which spaces one hub element from the adjacent hub element to provide a peripheral slot or groove 36 between adjacent hub elements. Each of the hub elements includes four equally spaced holes adjacent its periphery and, in the bore through it, a key way slot.

Figure 2:
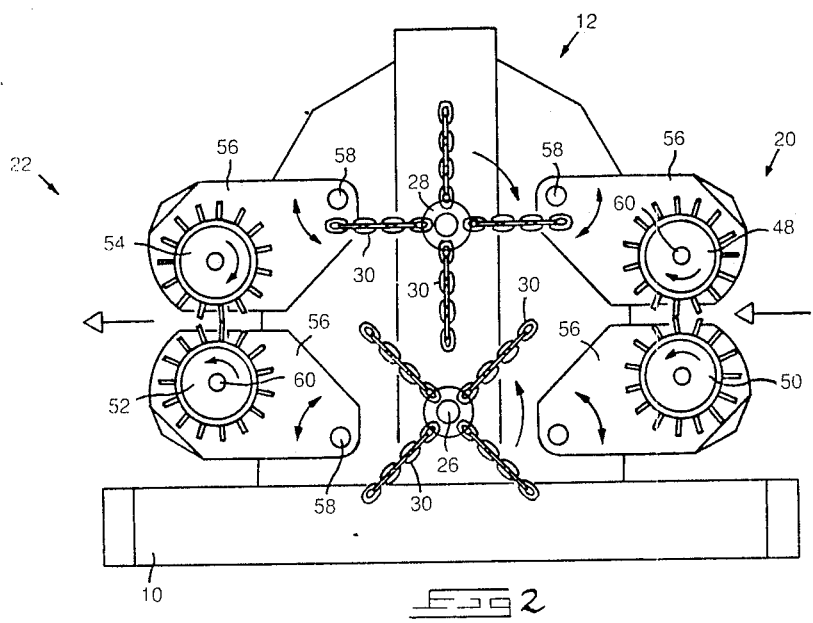
FIG. 2 is a partially schematic sectioned end elevation of the FIG. 1 debarking apparatus.

To assemble the rotors 14 and 16, a lock nut 40 is located at one end of the shafts and the hub elements 28 are slipped sequentially onto the shafts 26 over a key 42 which locks the hub elements against rotation to the shafts 26. When the shafts 26 are fully loaded with the hub elements a second lock nut 40 is tightened up against the hub elements to hold them in frictional engagement with each other. A terminal link of each of the flail chains 30 is now located in a slot 36 between the hub elements with the chains on each of the rotors 14 and 16 being out of phase with each other as shown in FIG. 2. The locking rods 32 are now fed through the registering holes 38 in the hub elements and through the terminal links of the chains 30 to lock the chains 30 to the hubs of the rotors.

The flail chains of this embodiment of the invention are between 10 and 15 mm chain and it has been found to be critically important to the invention that the circumferential paths of the flail chains 30 overlap each other as shown in FIG. 1 and 2 of the drawings. The degree of overlap has been found, with chains having a length of about 350 millimeters, to be about one quarter of the diametrical distance between the ends of two opposed chains on a common rotor. The degree of chain overlap may of course by varied from one application to another.

The rotors 14 and 16 are releasibly connected to the drive arrangement 18 through couplers 43. The portions of the end wall which carries the free ends of the rotor shafts are bolt-on cover plates, not shown, which carry the shaft bearings and which, when the shafts 26 are disconnected from the couplers 43, are removed so that the rotors with their flails may simply be withdrawn from the housing 12 for chain replacement and general maintenance.

The rotors 14 and 16 are driven in contra-rotation as shown by the arrows in FIG. 2 by a gear train of the drive arrangement 18 which is adapted, at 44 in FIG. 1, for attachment to the power take-off coupling of a tractor or other convenient prime mover.

The drive shaft 26 of the rotor 16 is coupled to the impeller of a hydraulic pump 45.

Figure 4:
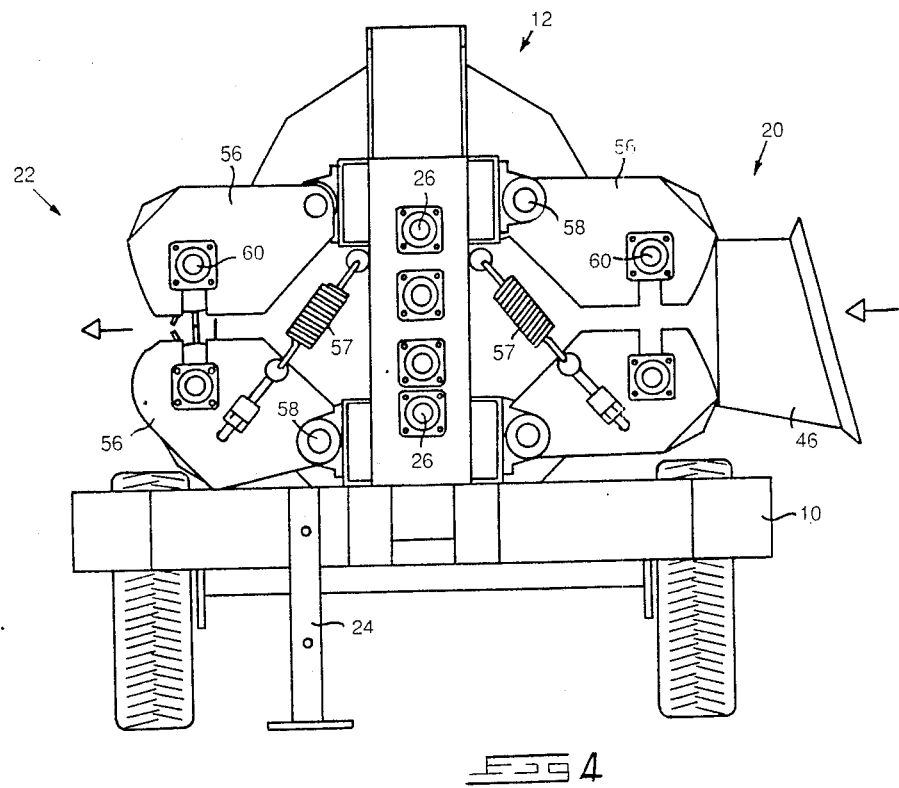
FIG. 4 is an outside end elevation of the debarking apparatus of the invention shown in FIG. 1.

The housing 12 carries on one side, as is more clearly seen in FIG. 4, an inlet chute 46 through which logs are fed into the debarker.

The log guide arrangement 20 and the output roller arrangement 22 each consist of guide rollers 48, 50 and 52, 54 respectively. Each of the four rollers include peripheral gripping formations for driving a log without slippage. The rollers of the guide arrangement 20 and output roller arrangement 22 are each located in a sub-assembly or sub-housing 56 which is pivotally connected at opposite ends to the end walls of the housing 12 at 58. The lower roller sub-housings 56 of each pair of rollers is upwardly biased by springs 57, as shown in FIG. 4. The upper sub-housings 56 of the upper rollers of each pair are downwardly biased towards the rollers beneath them under gravity. The sub-housings 56 and so the rollers which they carry are prevented from coming into contact with each other by suitable stops on the end walls of the housing which are not shown in the drawings.

Each of the rollers 48 to 54 is fixed to a drive shaft 60 with each of the drive shafts 60 being driven by a hybraulic motor 62. It is of course possible to operate the machine reasonably efficiently by driving only one shaft 60 of each pair of rollers.

The chassis 10 carries a hydraulic oil header tank 64 from which oil is pumped by the pump 45 on the drive shaft of the rotor 16 in series through each of the four hydraulic motors 62 so that both rollers of the log guiding arrangement 20 and the rollers of the roller arrangement 22 all rotate at a common speed. The roller hydraulic circuit includes a first valve, not shown, by means of which the speed of the rollers may be increased or decreased and a second valve for stopping, forwarding and reversing the direction of rotation of the rollers. Obviously, the rollers of each pair are rotated by their motors in opposite direcitons, as shown by the arrows in FIG. 2, to feed logs placed between them in a uniform direction through the housing.

In use, the debarker of the invention is towed to a log pile in a plantation, where it may be disconnected from the towing vehicle, and the leg 24 is adjusted to level the chassis 10. The coupling 44 is connected to the power take-off of a tractor or other suitable prime mover which may be a motor which is permanently mounted on the chassis 10. The drive arrangement 18 is activated by what ever driving source is attached to the coupling 44 to drive the rotors at a speed of between 750 and 600 revolutions per minute. With the chain length described above the peripheral speed of the flail chains is, at the lower end of the speed range, about 20 meters/second and at the upper end of the speed range about 40 meters/second. The actual speed selected will depend on the degree of wetness of the elongated timber elements to be debarked and delimbed by the debarker. For very dry wood the speed of the rotors would be adjusted towards the upper end of the speed range and for wet wood towards the lower end of the speed range.

The hydraulic pump 45, which is driven through the driving arrangement 18, pumps hydraulic fluid from the tank 64 through the series connected motors 62 back to the tank 64 and so on to rotate the guide and output rollers at a common feed and output speed. Logs to be debarked are now fed plurally into the inlet chute 46 between the rollers 48 and 50, which are moved apart by the logs, to enable the logs to be entrained by the rotating rollers through the space between the flail rotors 14 and 16 to the output roller arrangement 22. The direction of drive of the flail rotors, as shown by the arrows in FIG. 2, assists the passage of the log through the housing towards the output roller arrangement. The output rollers engage the leading end of the log, move apart to accommodate it, and because they are rotating at the same speed as the rollers of the log guiding arrangement, ratard acceleration imposed on the logs by the flails in the housing. The rotating flails pulverise and beat the bark from the logs on their passage through the housing without undue damage to the timber of the logs. The underside of the housing 12 is open and the fragmented bark is dropped through the base of the housing onto the ground below the chassis 10. The distance between the rollers of the guide arrangement 20 and those of the output roller arrangement 22 is, in this embodiment of the invention, of the order of 1,2 meters enabling relatively short logs and branches to be debarked and delimbed.

In a second embodiment of the invention, which is not illustrated, each of the pivoted sub-housings 56 could include a pair of rollers, as opposed to the single rollers illustrated in the drawings, with the rollers of each pair being parallel to and spaced from each other in the direction of log travel through the housing 12 so that logs or branches gripped between opposed pairs of guide arrangement rollers are held horizontally and presented centrally between the rotors 14 and 16 and also so that the debarked logs leave the output rollers horizontally. In this embodiment it is probably only necessary to drive one roller of each pair of rollers to provide adequate log speed.

If the debarker is to be statically mounted at a fixed location input and output conveyors could be arranged adjacent the debarker for feeding logs into and away from the debarker. A bark conveyor could also be located beneath the housing to clear flailed bark from beneath the debarker.

The invention is not limited to the precise details as herein described. For example the upper roller 54 of the output roller arrangement 22 and perhaps even the roller 48 of the feed arrangement need not be driven and could be a split across its length or one or both rollers of each pair could be clad with resilient rubber sleeves instead of the log gripping formations shown in the drawings to grip logs of various diameters which are fed simultaneously into the machine. It is only necessary that the rollers of the feed and output roller arrangements frictionally engage the logs which are passed through the housing to deccelerate their movement from the housing.

I claim:

1. Debarking apparatus including a housing, two elongated rotors which are mounted for rotation in the housing with their axes parallel to and spaced apart from each other in a common plane, flexible flail elements on each of the rotors with the lengths of the flail elements and their positions on the rotors being such that the circumferential paths of rotation of the flail elements on one rotor overlap and pass between those on the other rotor, means for driving the rotors in rotation, and guide means on the housing for guiding elongated timber members in a direction substantially perpendicular to said common plane and between the rotors to be delimbed and debarked by the flail elements in their zone of overlap.

2. Debarking apparatus as claimed in claim 1, in which the flail elements are lengths of metal chain.

3. Debarking apparatus as claimed in claim 1, in which the rotor drive means is adapted to drive the rotors in opposite directions of rotation with the direction of rotation of the flail elements in their zone of overlap being in substantially the same direction and in the direction in which the timber members are guided by the guide arrangement between the rotors.

4. Debarking apparatus as claimed in claim 1, in which the timber element guide arrangement includes two horizontal and parallel guide rollers with both rollers being pivotally attached to the housing for movement in a substantially vertical direction toward and away from each other, means biasing each roller toward the other, and drive means connected to at least one of the rollers for driving the roller to feed timber members placed between the rollers into the housing.

5. Debarking apparatus as claimed in claim 4, in which the drive means includes a pair of horizontal and parallel output rollers on the side of the flail rotors opposite to that on which the guide rollers are situated, both of the output rollers being pivotally attached to the housing for movement in a substantially vertical direction toward and away from each other, means biasing each roller toward the other, and drive means connected to at least one of the rollers to drive the roller to feed timber elements placed between the rollers from the housing.

6. Debarking apparatus as claimed in claim 5, in which the drive means which is connected to the guide and output rollers of the guide means are adapted to drive the rollers at a common speed of rotation.

7. Debarking apparatus as claimed in claim 1, in which said axes are horizontal.

* * * * *